US010963837B2

(12) United States Patent
Liggett

(10) Patent No.: US 10,963,837 B2
(45) Date of Patent: *Mar. 30, 2021

(54) SYSTEMS, METHODS, AND SOFTWARE FOR INTEGRATION OF ONLINE RESEARCH TASKS INTO LAW FIRM WORKFLOW

(71) Applicant: Thomson Reuters Enterprise Centre GmbH, Zug (CH)

(72) Inventor: Trace Liggett, Rosemount, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,551

(22) Filed: Aug. 23, 2016

(65) Prior Publication Data

US 2017/0116692 A1 Apr. 27, 2017

Related U.S. Application Data

(63) Continuation of application No. 11/436,061, filed on May 16, 2006, now Pat. No. 9,466,048.
(Continued)

(51) Int. Cl.
*G06Q 50/18* (2012.01)
*G06Q 10/10* (2012.01)
(Continued)

(52) U.S. Cl.
CPC ........... *G06Q 10/10* (2013.01); *G06F 16/248* (2019.01); *G06F 16/93* (2019.01); *G06F 16/951* (2019.01);
(Continued)

(58) Field of Classification Search
CPC .................................................. G06F 40/166
See application file for complete search history.

(56) References Cited

U.S. PATENT DOCUMENTS

| 5,530,880 A | 6/1996 | Katsurabayashi |
| 5,864,846 A | 1/1999 | Voorhees et al. |

(Continued)

FOREIGN PATENT DOCUMENTS

| EP | 1207465 A2 | 5/2002 |
| JP | 2000122774 A | 4/2000 |

(Continued)

OTHER PUBLICATIONS

Kirstensen, Extend nternet Explorer Context-menu, Feb. 19, 2005, accesseed Jun. 22, 2016 at http://smallvoid.com/article/ie-context-menu.html.*

(Continued)

*Primary Examiner* — William Spieler
(74) *Attorney, Agent, or Firm* — Norton Rose Fulbright US LLP

(57) ABSTRACT

Legal professionals often conduct online research as part of their efforts to produce documents, such as legal briefs. The present inventor recognized that online research tools and desktop applications, such as word processors, are functionally isolated from each other, forcing users to awkwardly switch between them as they work. Accordingly, the inventor devised, among other things, an exemplary toolbar that resides adjacent an active application window, such as a word processor. In operation, a user selects one or portions of text, such as a name or fact pattern, in the window, and activates the toolbar using a right-click command. Upon activation, a customizable menu is displayed, enabling the user to select from one or more listed workflow tasks and ultimately to cause an online research system to return search results based on the task and text selections.

14 Claims, 7 Drawing Sheets

Related U.S. Application Data

(60) Provisional application No. 60/718,680, filed on Sep. 20, 2005, provisional application No. 60/681,272, filed on May 16, 2005.

(51) Int. Cl.
*G06F 16/93* (2019.01)
*G06F 16/248* (2019.01)
*G06F 16/951* (2019.01)
*G06Q 10/06* (2012.01)
*G06F 40/166* (2020.01)

(52) U.S. Cl.
CPC ........... *G06F 40/166* (2020.01); *G06Q 10/06* (2013.01); *G06Q 10/0633* (2013.01); *G06Q 50/18* (2013.01)

(56) References Cited

U.S. PATENT DOCUMENTS

| | | | |
|---|---|---|---|
| 5,873,077 A | 2/1999 | Kanoh et al. | |
| 5,950,194 A | 9/1999 | Bennett et al. | |
| 6,348,927 B1* | 2/2002 | Lipkin | H04L 67/02 345/419 |
| 6,460,029 B1 | 10/2002 | Fries et al. | |
| 6,505,238 B1* | 1/2003 | Tran | H04L 61/1523 709/208 |
| 6,785,670 B1 | 8/2004 | Chiang et al. | |
| 7,133,862 B2 | 11/2006 | Hubert et al. | |
| 2001/0000537 A1* | 4/2001 | Inala | G06F 17/30867 715/254 |
| 2001/0044849 A1* | 11/2001 | Ndili | H04L 29/06 709/230 |
| 2002/0091836 A1* | 7/2002 | Moetteli | G06F 17/30899 709/227 |
| 2002/0123902 A1 | 9/2002 | Lenore et al. | |
| 2002/0188603 A1* | 12/2002 | Baird | G06F 17/30637 |
| 2003/0135752 A1* | 7/2003 | Sokolic | G06F 21/6245 726/21 |
| 2004/0260680 A1 | 12/2004 | Best et al. | |
| 2005/0076019 A1 | 4/2005 | Jackson et al. | |
| 2005/0086078 A1* | 4/2005 | Maloney | G06F 19/325 705/2 |
| 2005/0091191 A1* | 4/2005 | Miller | G06F 16/38 |
| 2005/0078633 A1 | 12/2005 | Kemp | |
| 2006/0111953 A1 | 5/2006 | Setya | |
| 2008/0103923 A1* | 5/2008 | Rieck | G06Q 30/0635 705/26.41 |

FOREIGN PATENT DOCUMENTS

| | | |
|---|---|---|
| JP | 2000242634 A | 9/2000 |
| WO | WO-2006/125027 A1 | 11/2006 |

OTHER PUBLICATIONS

Source code of http://westlaw.com of Sep. 13, 2004, accessed Sep. 11, 2017 from http://:web.archive.org/web/20040913094956/http://westlaw.com.*
Chen, Extending the Internet Explorer context menu, https://blogs.msdn.microsoft.com/oldnewthing/20040524-00/?p=39213 (Year: 2004).*
Williams, IEContextMenu_Reg, http://web.archive.org/web/20030502210602/http://www.rpi.edu:80/~willij3/hacks/IEContextMenu_Reg.txt (Year: 2003).*
Westlaw, Customizable Solutions, http://intranetsolutions.westlaw.com/customize/wizards/ (Year: 2001).*
Westlaw, Customizable Solutions, accessed Feb. 20, 2019 at http://web.archive.org/web/20010717134228/http://integrationsolutions.westlaw.com/customize/default.wl (Year: 2001).*
International Search Report and Written Opinion, PCT/US2006/019134, dated Sep. 6, 2006, 11 pages.
Japanese Official Action and English translation thereof, dated Sep. 15, 2011, issued on corresponding Japanese Patent Application No, 2008-512480.

* cited by examiner

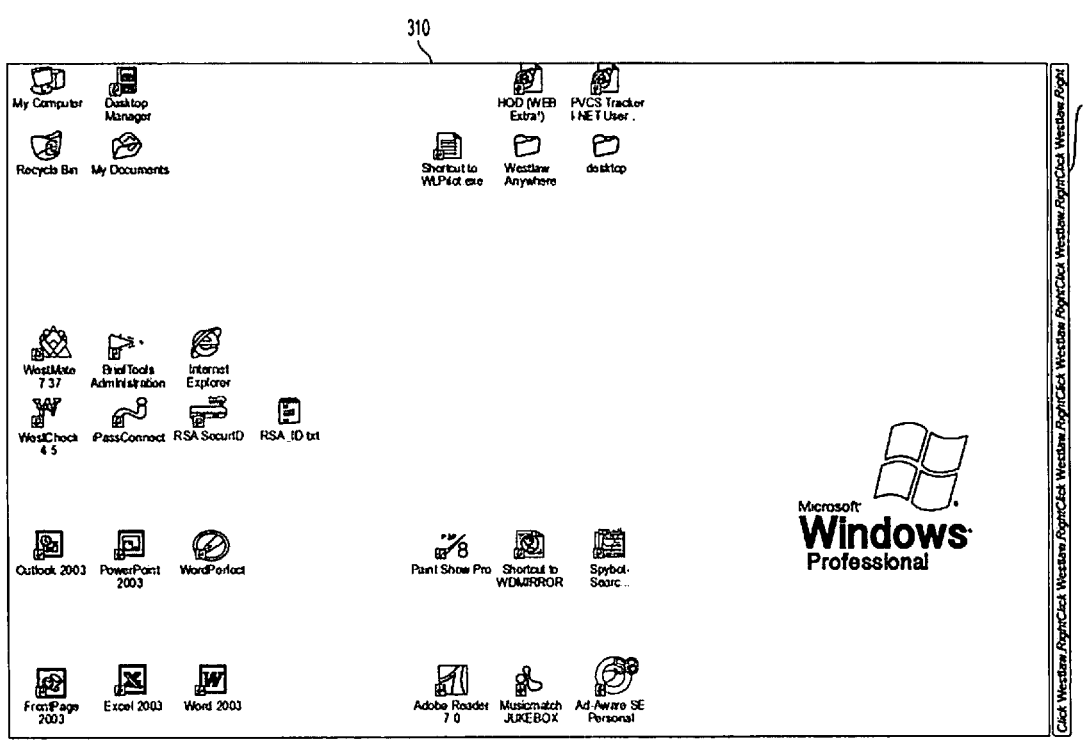
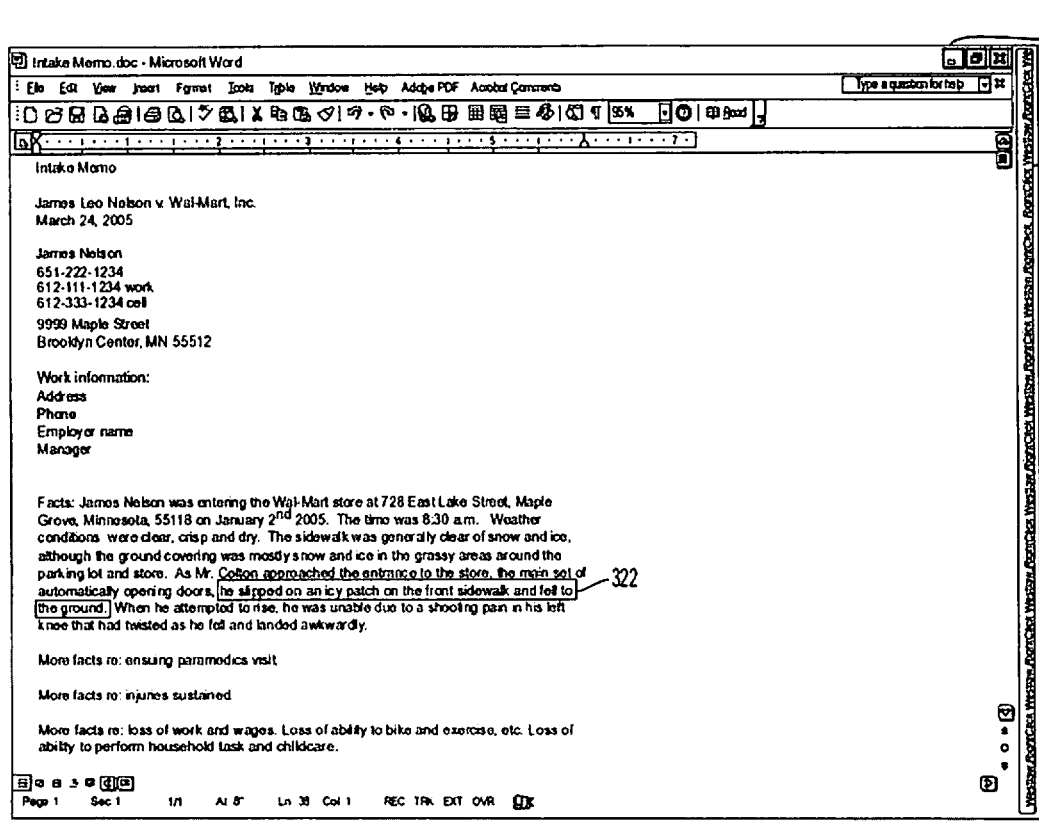
FIGURE 3

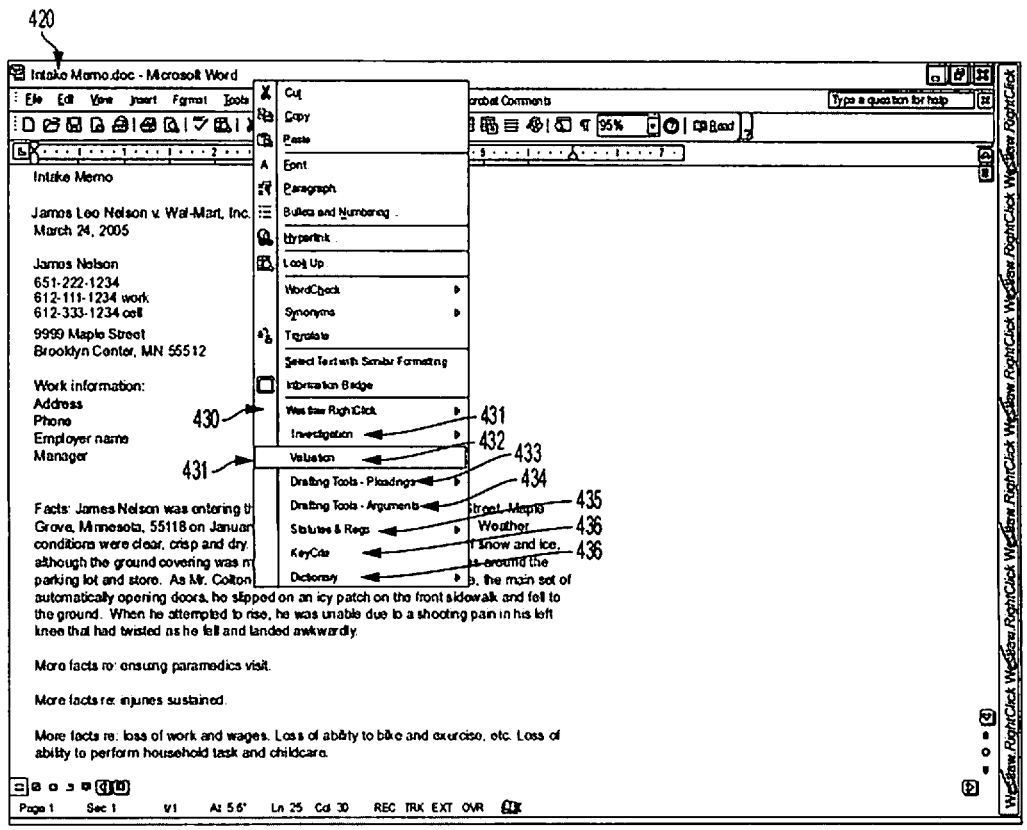
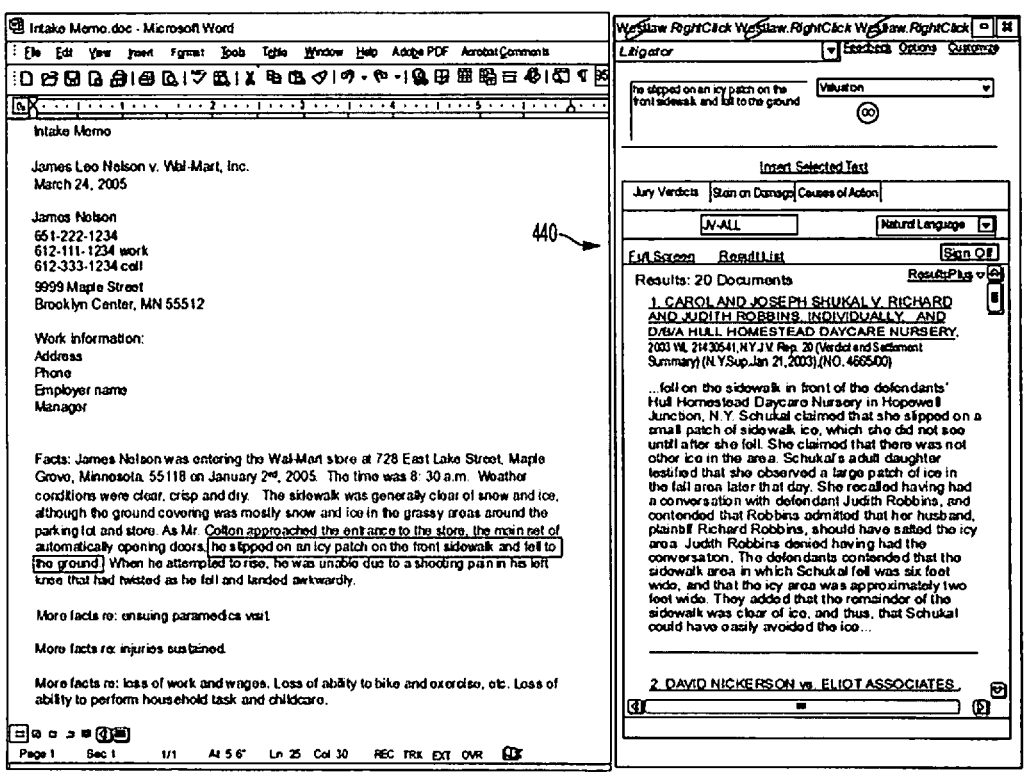
FIGURE 4

| DisplayText | URL |
|---|---|
| KeyCite | http://wireless.westlaw.com/KeyCite/Default.wl?cite=qtext&CMD=KC&pwd=mypassword& |
| findbyserial | xx |
| Find By Cite | http://wireless.westlaw.com/find/default.wl?Cite=101sct1&RS=WLDT1.0&VR=1.0&FindTy |
| Search | http://wireless.westlaw.com/Search/default.wl?RP=%2FWelcome%2FFrameless%2FSear |
| km Search | http://westkm25demo.west.thomson.com/km/MIDocsCustom.aspx?dicslw=1&wlSearchQu |
| km KeyCite | http://westkm25demo.west.thomson.com/km/MIDocsCustom.aspx?dicslw=1&cite=101sct1&| |
| GOOGLE De | http://127.0.0.1:4664/search&s=2465724061?q=liggett&ie=UTF-8&btnG=Search+Desktop |
| Briefs | E http://wireless.westlaw.com/Search/default.wl?RP=%2FWelcome%2FFrameless%2FSear |
| Causes of Act | C http://wireless.westlaw.com/Search/default.wl?RP=%2FWelcome%2FFrameless%2FSear |
| DCT Dockets | C http://wireless.westlaw.com/Search/default.wl?RP=%2FWelcome%2FFrameless%2FSear |

FIGURE 5 http://wireless.westlaw.com/KeyCite/Default.wl?cite=qtext&CMD=KC&pwd=mypassword&clientid=myclientid

| urlParamNam | ValueReference |
|---|---|
| cite* | whatever is sent by the calling application |
| &pwd= | 9876542gkw |
| &clientid= | 1234-3434 | http://wireless.westlaw.com/KeyCite/Default.wl?cite=101SCT1&CMD=KC&pwd=9876542fgkw&clientid=1234-3434

FIGURE 6

SYSTEMS, METHODS, AND SOFTWARE FOR INTEGRATION OF ONLINE RESEARCH TASKS INTO LAW FIRM WORKFLOW

CROSS-REFERENCE TO RELATED APPLICATION

The present application is a continuation of U.S. patent application Ser. No. 11/436,061, entitled SYSTEMS, METHODS, SOFTWARE AND INTERFACES FOR INTEGRATION OF ONLINE RESEARCH TASKS INTO LAW FIRM WORKFLOW, filed May 16, 2006, which claims priority to U.S. Provisional Application No. 60/681,272 entitled SYSTEMS, METHODS, AND INTERFACES FOR INITIATING SEARCH OF ONLINE LEGAL DATABASES, filed May 16, 2005 and U.S. Provisional Application No. 60/718,680 entitled SYSTEMS, METHODS, AND INTERFACES FOR INITIATING SEARCH OF ONLINE LEGAL DATABASES, filed Sep. 20, 2005. The disclosures of the above applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2005, West Services Inc.

TECHNICAL FIELD

Various embodiments of the present invention concerns information-retrieval systems, such as those that provide legal documents or other related content, and user interfaces for such systems.

BACKGROUND

Judges and lawyers within the American legal system, as well as many others across the globe, are continually researching an ever-expanding body of legislation and judicial opinions to assist them understanding and resolving new or potential disputes. To facilitate this research, companies, such as West Publishing Company of St. Paul, Minn. (doing business as Thomson West), collect legal statutes, judicial opinions, law articles, and other legal and non-legal materials and make these available electronically over a computer network, through the Westlaw™ online research system. (Westlaw is a trademark licensed to Thomson West.)

At least one problem the present inventor recognized with this powerful system as well as other online research systems is that their valuable functionality is highly segregated from the functionality of other computer applications. For instance, legal researchers typically use results of their online legal research as part of a larger process of producing documents, such as legal briefs and memorandum. However, systems, such as the Westlaw system, are functionally separated from popular word processing applications, such as Microsoft Word or Corel WordPerfect, that are used for creating these documents. This means that users have to make awkward shifts from application window to application window, often cutting and pasting information from the word processor to the browser and vice versa to conduct their legal research and writing.

Accordingly, the present inventor has recognized at least a need for integrating the powerful functionality of systems, such as Westlaw, with other applications, such as word processors.

SUMMARY

To address this and/or other needs, the present inventor devised, among other things, systems, methods, and software that allow users to readily access online legal research tools while using other applications, such as word processors. One exemplary embodiment includes a customizable research toolbar, which may be downloaded from a server of an online research system onto a client device. The toolbar resides adjacent an active application window on the client device, such as a word processing application. In exemplary operation, a user highlights one or portions of text in the active window, and activates the toolbar using a right-click command. Upon activation, at least one workflow menu is displayed, enabling the user to select from one or more listed workflow operations. Selection of an exemplary workflow operation cause the toolbar not only to generate a corresponding browser command, such as a specially formatted URL, that includes a search string based on the highlighted text, but also to forward the URL to an associated browser component, which invokes the URL and returns search results based on the highlighted text. Some embodiments allow users to customize the workflow menu and/or the URLs based, for example, on their legal specialty and/or jurisdiction.

BRIEF DESCRIPTION OF DRAWINGS

FIG. 3 is a facsimile of an exemplary user interface 300 corresponding to one or more embodiments of the invention.

FIG. 4 is a facsimile of an exemplary user interface 400 corresponding to one or more embodiments of the invention.

FIG. 5 is an exemplary URL table 500 corresponding to one or more embodiments of the invention.

FIG. 6 is an exemplary parameter file 600 corresponding to one or more embodiments of the invention.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
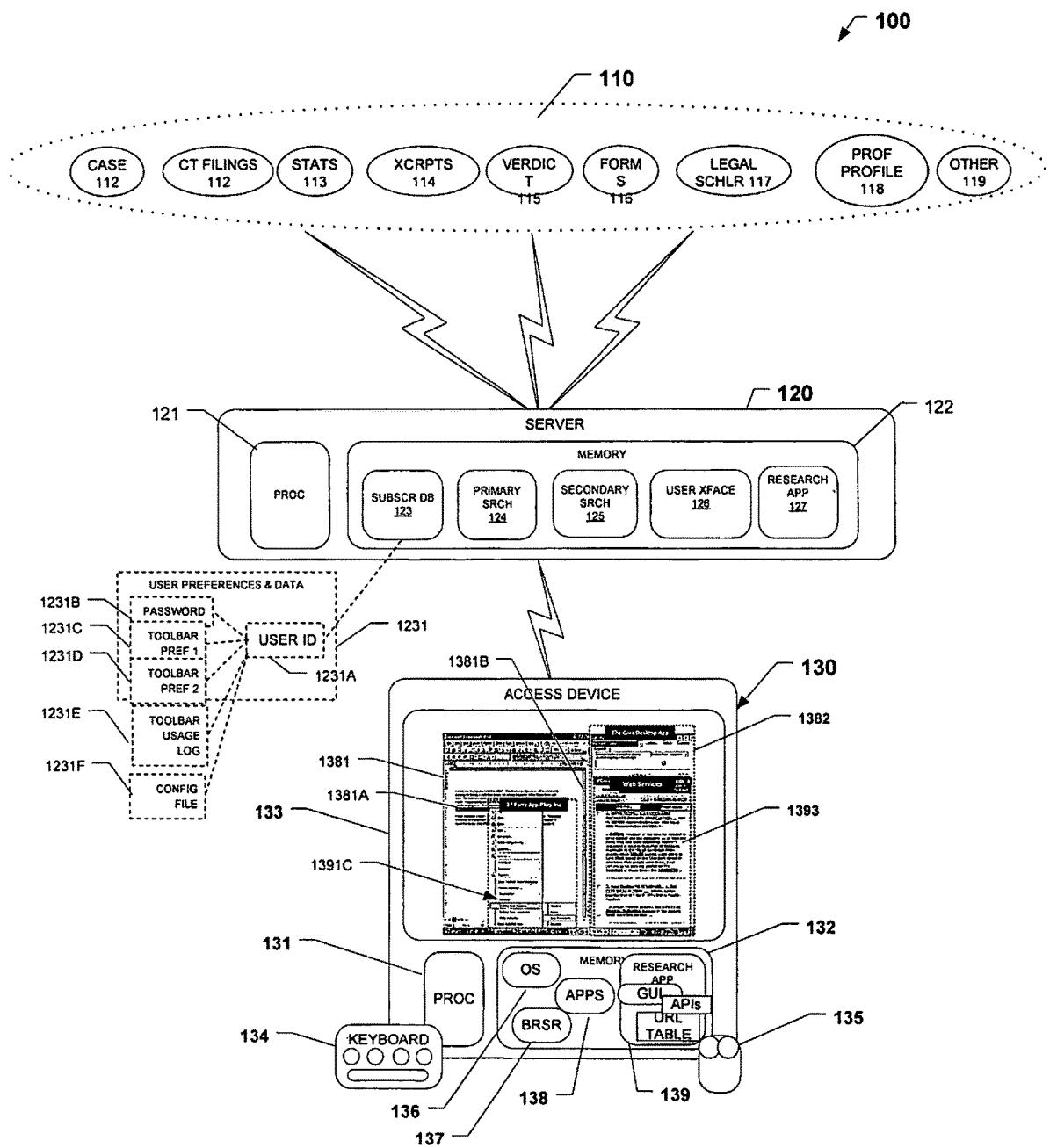
FIG. 1 is a diagram of an exemplary system 100 corresponding to one or more embodiments of the invention.

FIG. 1 shows an exemplary online information-retrieval system 100. System 100 includes one or more databases 110, one or more servers 120, and one or more access devices 130.

Exemplary Databases

Databases 110 include a set of one or more databases. In the exemplary embodiment, the set includes a caselaw database 111, a court filings database 112, statutes database 113, a transcripts (XCRPTS) database 114, a verdict and settlement database 115, a legal forms database 116, a legal scholarship databases 117, professionals database 118, and other databases 119.

Case law database 111 generally includes electronic text and image copies of judicial opinions for decided cases for one or more local, state, federal, or international jurisdictions. Court-filings database 112 includes electronic text and image copies of court filings related to one or more subsets of case law database 111. Exemplary court-filing documents include briefs, motions, complaints, pleadings, discovery matter.

Statutes database 113 include federal, state, and local statutes. Transcripts database 114 includes transcripts of local, state, federal, and international legal proceedings. Verdict and settlement database 115 includes electronic text and image copies of documents related to the determined verdict, assessed damages, or negotiated settlement of legal disputes associated with cases within caselaw database 111. Legal forms database 116 includes legal forms, such as agreements, complaints, jury instructions, wills, etc. Legal scholarship databases 117 include law review articles, legal encyclopedia articles, legal headnotes, and legal classifications. Professional databases 118 include one or more databases or professional directories. Other databases 119 includes one or more other databases containing documents regarding news stories, business and finance, science and technology, medicine and bioinformatics, intellectual property information, and other public information. In some embodiments, the logical relationships across documents in various databases are determined manually or using automatic discovery processes that leverage information such as litigant identities, dates, jurisdictions, attorney identifies, court dockets, and so forth to determine the existence or likelihood of a relationship between any pair of documents.

Databases 110, which take the exemplary form of one or more electronic, magnetic, or optical data-storage devices, include or are otherwise associated with respective indices (not shown). Each of the indices includes terms and/or phrases in association with corresponding document addresses, identifiers, and other information for facilitating the functionality described below. Databases 112, 114, and 116 are coupled or couplable via a wireless or wireline communications network, such as a local-, wide-, private-, or virtual-private network, to server 120.

Exemplary Server

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor 121, a memory 122, a subscriber database 123, one or more search engines 124 and interface module 125.

Processor 121, which is generally representative of one or more local or distributed processors or virtual machines, is coupled to memory 122. Memory 122, which takes the exemplary form of one or more electronic, magnetic, or optical data-storage devices, stores subscription database 123, search engines 124, and litigation module 127.

Subscription database 123 includes subscriber-related data for controlling, administering, and managing pay-as-you-go- or subscription-based access of databases 110. Subscriber database 123 includes subscriber-related data for controlling, administering, and managing pay-as-you-go or subscription-based access of databases 110.

In the exemplary embodiment, subscriber database 123 includes one or more data structures, of which data structure 1231 is representative. Data structure 1231 includes a customer or user identifier portion 1231A, which is logically associated with data elements or fields, such as fields 1231B, 1231C, and 1231D. Field 1231B includes information such as a user password and/or information identifying one or more user accounts, such as a law firm or corporate account. Fields 1231C includes one or more values governing whether litigation documents are charged on a transactional or per-access basis or whether access to these documents is included within a flat-rate or other type of subscription. In some embodiments, this field may also identify, indicate, or represent a specific pricing schedule to be used in assessing access fees for litigation (pre-decision) documents.

Search engines 124 provide Boolean or natural-language search capabilities for databases 110. Additionally, search engines 124 includes a result extension capability, such as that described in copending U.S. patent application Ser. No. 11,028,476 which suggests alternative relevant documents.

User interface module 125, which, among, other things defines one or portion of a graphical user interface that helps users define searches for databases 110. Software 125 includes one or more browser-compatible applets, webpage templates, user-interface elements, objects or control features or other programmatic objects or structures.

Research tool bar module 126 includes, among other things, downloadable client-side research toolbar software 1261, software distribution software 1262, and server-side administration software 1263. Client-side research toolbar software allows users to develop a personalized view of an online research system, such as the Westlaw system, and to integrate the personalized view into his or her attorney legal workflow. In one embodiment, the toolbar software provides a workflow menu with options that correspond to steps in a legal workflow for specific legal practice areas and/or jurisdictions, and brings search capabilities and result data side by side with Outlook, Word, WordPerfect, Adobe, Internet Explorer and any other third party application with just one "right click" in that application. The user can further customize the software to include any data sources they wish.

Server 120 is communicatively coupled or couplable via a wireless or wireline communications network, such as a local-, wide-, private-, or virtual-private network, to one or more accesses devices, such as access device 130.

Exemplary Access Device

Access device 130 is not only communicatively coupled or couplable to server 130, but also generally representative of one or more access devices. In the exemplary embodiment, access device 130 takes the form of a personal computer, workstation, personal digital assistant, mobile telephone, or any other device capable of providing an effective user interface with a server or database.

Specifically, access device 130 includes one or more processors (or processing circuits) 131, a memory 132, a display 133, a keyboard 134, and a graphical pointer or selector 135. Memory 132 stores code (machine-readable or executable instructions) for an operating system 136, a browser 137, applications 138, and client-side research software 139, which provides functionality as further shown and described herein. In the exemplary embodiment, operating system 136 takes the form of a version of the Microsoft Windows operating system, and browser 137 takes the form of a version of Microsoft Internet Explorer. Applications 138 include Outlook email application, Word and WordPerfect word processing applications, Adobe desktop publishing application, and Internet Explorer browser application. Research software 139 includes a tool bar plug-in portion 1391, a research portion 1392, a web services portion 1393.

In the exemplary embodiment, the research application (or software), takes the form of a toolbar and includes the following functionality: sliding, tacking, un-tacking, mouse hovering, minimizing, closing, startup, searching, progress bar, customization, etc. As a toolbar, the research application always stays "on top,", and thus cannot get 'lost' behind other application windows. Additionally, in some embodiments, the toolbar is not maximizable, but has preset maximum and minimum sizes which the user can customize. Additionally, the core desktop application is XML driven and configurable, enabling it to utilize a wide variety of web services.

Other functions include application state management, which entails saving and restoring sizes and positions of other applications and desktop icons as the tool bar is opened, tacked, un-tacked, minimized, and closed.

The user interface for the core application includes a search text area, go button, jurisdiction menu, customization interface, client ID input, options, insert-selected-text command, progress bar, and help. For cost recovery, the exemplary embodiment provides a client ID input which allows one to associate a client ID or matter number with given research and/or drafting activity. The input field is associated with a default setting, a pick list, and/or a most-recent pick lists. Some embodiments prompt for a client ID input for each use, or after a period of inactivity.

The plug-in or add-in portion of the research software incorporates a simple XML configuration and messaging. In operation, the plug-in portion sends a function ID, such as search, along with query text (such as the selected text) to the core research application for handling. (Core application forms the function ID and search into a URL and includes a mini-browser capability for invoking the URL and retrieving the results of the associated search operation. In some embodiments, the plug-in portion has extensible parameters, such as jurisdiction which is defined in the config files. The plug-in portion also receives information, such as text, from the core research application, and inserts into document in the active window at a current cursor position.

This application program interface (API) separates the third-party application from the complexities of the core research software. Its function is to tell the third-party application what the menu and cascades should look like, and what ID should be sent to the core research software for each item in the menu. The API also tells the third-party application when the menu has been changed via customization so the third-party application can rebuild it. Finally, the API can send text to the third-party application and let the third-party application know that the core software intends to insert the text at the cursor position.

Exemplary Methods of Operation

Figure 2:
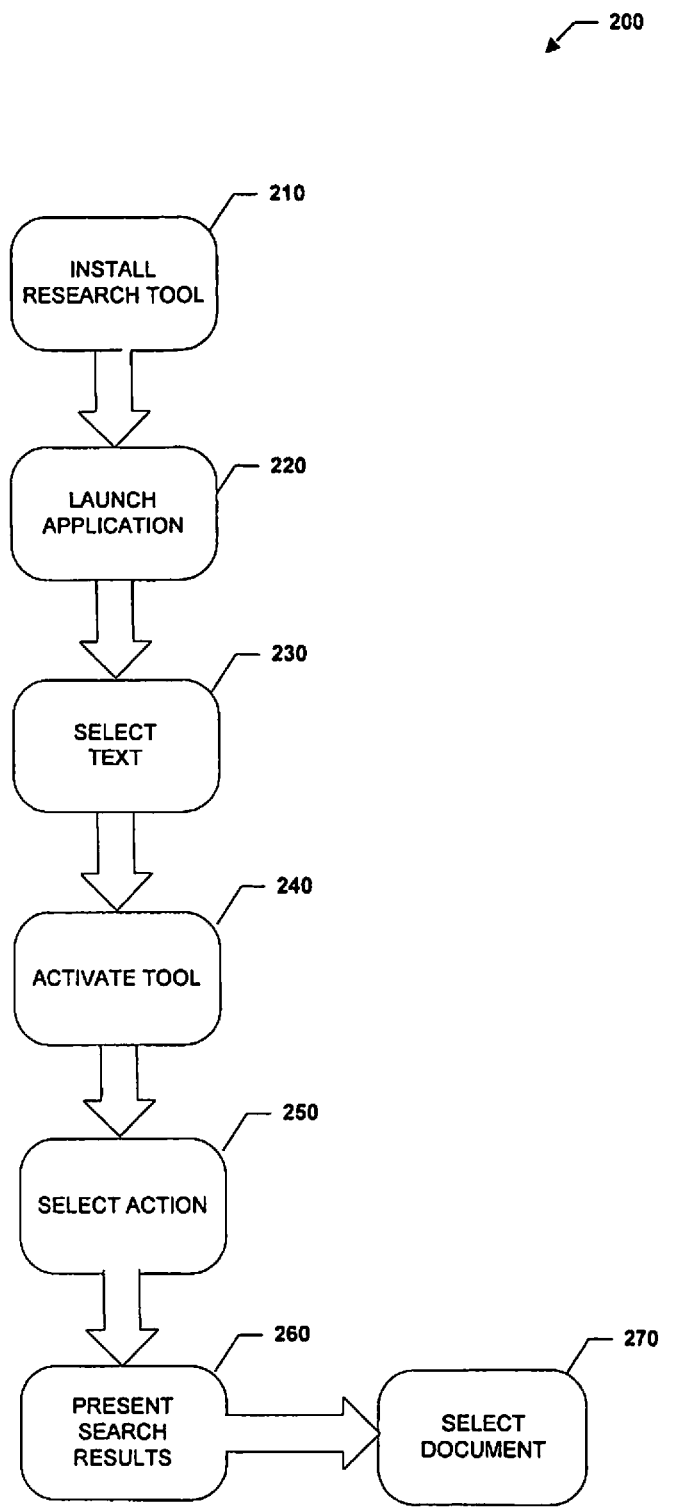
FIG. 2 is a flowchart corresponding to one or more exemplary methods of operating system 100 and one or more embodiments of the invention.

FIG. 2 shows a flow chart 200 of one or more exemplary methods of operating an information-management system, such as system 100. Flow chart 200 includes blocks 210-290, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

Block 210 entails installing the research software on to one or more client devices. In the exemplary embodiment, this entails a user directing a browser in a client access device, such as access device 130, to internet-protocol (IP) address for an online information-retrieval system, such as the Westlaw system and then logging onto the system using a username and/or password. Successful login results in a web-based interface being output from server 120, stored in memory 132, and displayed by client access device 130.

The interface includes an option for initiating download of desktop research software with corresponding toolbar plug-ins for one or more applications. If the download option is initiated, download administration software ensures that the client access device is compatible with the research software and detects which compatible third-party applications are present on the client device and which of these have available research add-ins (plug-ins). The user is then prompted regarding the detected applications for which add-ins are available and asked to select which ones to download add-ins for. Once the selections are made, the appropriate software is downloaded and installed on the client device.

Some embodiments include a network-push capability which allows allowing larger customers to push out the software from a central location and installed remotely by network administrators. After or during installation, one or more aspects of the research software, such as menus and database options can be customized, as further described below. Execution continues at block 220.

Block 220 entails launch of one or more third-party applications. In the exemplary embodiment, this entails a user launching and opening or creating a document using one or more of the following independent applications: Microsoft Word word processing application, Corel WordPerfect word processing application, Internet Explorer browser application, Adobe Acrobat desktop publishing application, and Microsoft Outlook email application. FIG. 3 shows an exemplary desktop interface 310 and a Microsoft word interface 320, which include or are juxtaposed to respective research toolbars 312 and 322 that indicate to the user that an integrated research capability is available as well as how to initiate the capability. Although shown as a right vertical sidebar, toolbars 312 and 322 may take any number of shapes and configurations and be placed anywhere on the desktop, preferably in proximity to the active window. Execution continues at block 230.

Block 230 entails selecting one or more portion of text in an active window of an application. In the exemplary embodiment, this entails a user a pointing device to select one or more portions of contiguous or noncontiguous text. For example, a user may select a name of a person or company, a case name, a legal citation, a paragraph containing a fact pattern, or a combination of these. See for example, selected text 324 in FIG. 3, which states "he slipped on an icy patch on the front sidewalk and fell to the ground." Some embodiment may allow users to select objects such as images or embedded files. Execution proceeds to block 240.

Block 240 entails activating the research software. In the exemplary embodiment, this entails using a pointing device to perform a right click. However, other embodiments may provide hotkeys, voice commands, or other user interface mechanisms for activating the research software. In response to activation, the plug-in augmented third-party application associated with the active window presents a popup menu which includes a listing of legal workflow items. For example, FIG. 4 shows a word-processing window 420 (same as window 320) with a popup menu 430 displayed after activation of the research tool. Popup menu 430 lists, among conventional word processing items, workflow items: investigation item 431, valuation item 432, drafting tools-pleadings item 433, drafting tools-arguments item 434, statutes and regulations item 435, KeyCite citation checker 436, and dictionary 437. Notably, one or more of the items, such as items 431, 433, 435 are associated with additional items that appear in the form of cascaded menu (as shown in other interface figures herein.)

Next, FIG. 2 shows that block 250 entails selecting an action or item. In the exemplary embodiment, this entails the user using a pointing device to point and select one of the listed items from the popup menu 430. In some embodiments, the user signals a desire to launch or initiate a search, for example via voice command, function key, or hotkey. FIG. 4 shows via a box 438 that valuation item 432 has been selected. In response to the selection, the application associated with the active window, for example, the Microsoft Word application, uses a messaging system associated with the operating systems, such as windows messaging, to communicate to research application 139 that the user has selected a given item, valuation item 432 in the example, and sends the research application the selected text. Execution continues at block 260.

Block 260 entails presenting search results based on the selected text and menu item. In the exemplary embodiment, this entails the research application looking up the selected menu item in its uniform resource locator (URL) table and finding and completing a corresponding URL based on the selected text and/or one or more other parameters.

FIG. 5 shows an exemplary URL table 500, which includes one URL entry for each of the selectable menu items. Each URL has several parameters. After determining the matching URL based on the user menu selection, the research application replaces the values of these parameters with values it has saved in its parameter file. In addition to the selected text sent over by application for the active window, exemplary parameters include a user password and a client and/or matter identifier (ID) (such as an attorney docket number). FIG. 6 shows an exemplary parameter file 600 and how these parameters relate to a URL. In some embodiments, these parameter values are entered by the user the first time the research software is initiated or during installation; however in other embodiments, the parameters, such as user account and access credentials are determined by accessing cookies that contain this information based on prior access of one or more search systems, such as the Westlaw system. In some embodiments, the users are prompted to input any parameter values that may be necessary to complete the URL corresponding to the selected menu item. (Note that the mapping of the workflow menu item to the URL effectively maps the workflow menu items to specific databases and/or services within an online research systems, such as the Westlaw system.)

Once the URL is completed, the research software makes a call to its miniature "browser," using the completed URL. (In the exemplary embodiment, this is analogous to a user typing the URL into a browser address field.) In some embodiments, the research software makes use of the browser application native to the client device, rather than providing its own browsing capability. With the URL input, the research application communicates over a computer network with a server, such as server 120 in FIG. 1, requesting that the server conduct a search or data retrieval operation based on the parameters of the URL. In response, the server (or a device responsive to the server) identifies the data corresponding to the URL and returns it to the client device for display by the research application, with a designated portion of its interface. (Notably, one or more parameters of the URL, such as an embedded password enable transparent authentication of the user at the server; also, an embedded client identifier or docket number facilitates cost recovery for the data retrieval by associating the search activity with the client identifier.)

Block 270 entails inserting text from a retrieved document into the active window of the application. In the exemplary embodiment, this entails the user selecting a document from a listing of documents returned by the server, using a pointing device. Once selected, the user may invoke an interactive command icon on an interface portion of the research application and cause insertion of document or one or more selected portions of the document into the active window. In response, the selected portion(s) of the documents will be inserted at the current cursor position of the document in the active window. In some embodiments, the selected text inserted into the document along with associated bibliographic data, such as citation with appropriate citation data according to a "blue book" or scientific format. In some instances, this data is merely associated as meta data with the inserted text. In other embodiments, this citation insertion behavior is governed by one or more user preferences in a configuration file maintained for the user on server 120.

Exemplary Customization Features

Figure 7:
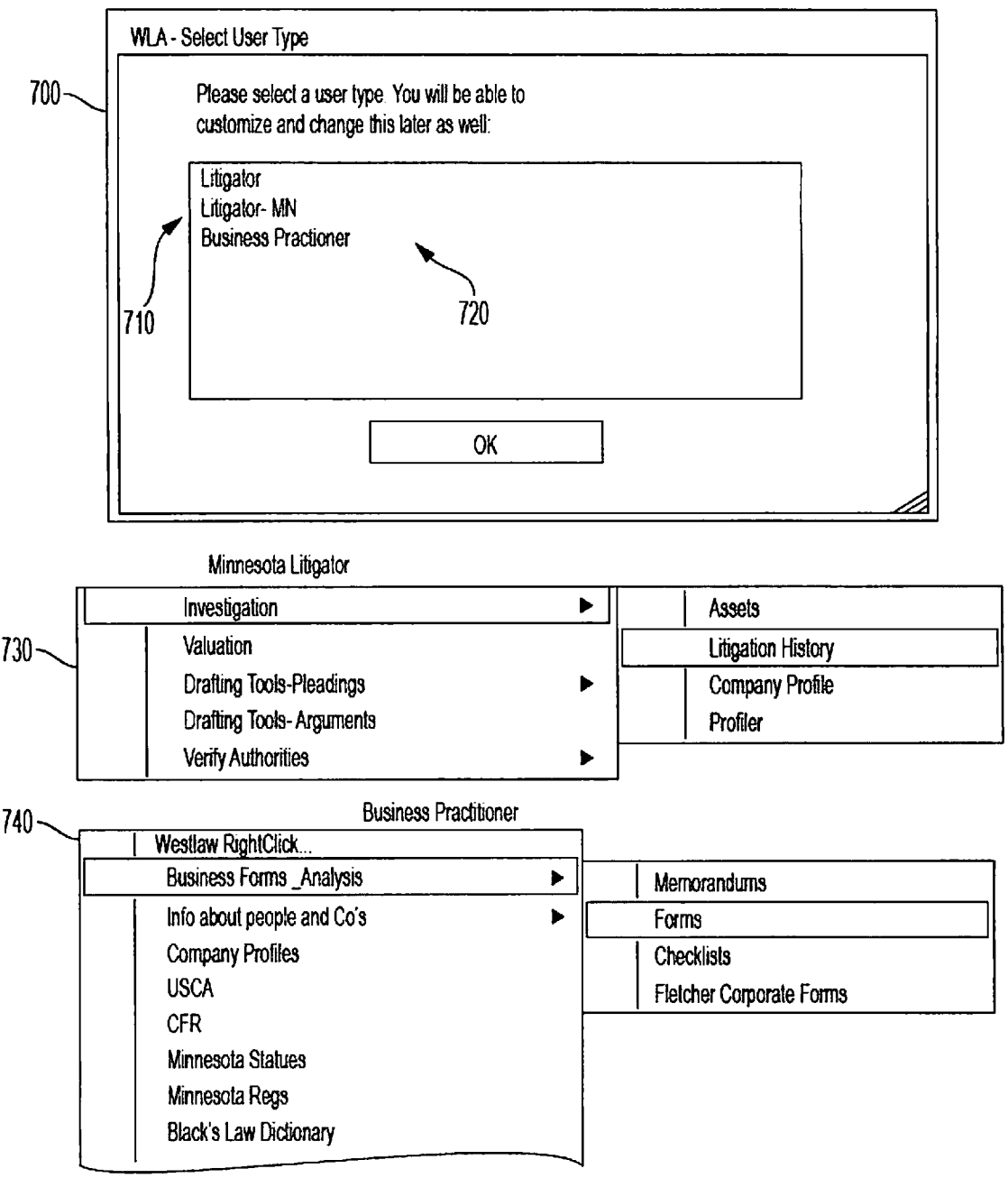
FIG. 7 is a facsimile of an exemplary user interface 700 corresponding to one or more embodiments of the invention.

One or more portion of the research software may be customized by the user to match their specific work, such as practice type and/or jurisdiction. For instance, FIG. 7 shows an input box 700, which may be presented during installation or by clicking on a particular icon after installation, to select one of a plurality of practice types. Selection of the Minnesota litigator option 710 configures the research application to present pop-menu 730 in response to invocation (right clicking), whereas selection of business-practitioner option 720 configures the research application to present menu 740.

Figure 8:
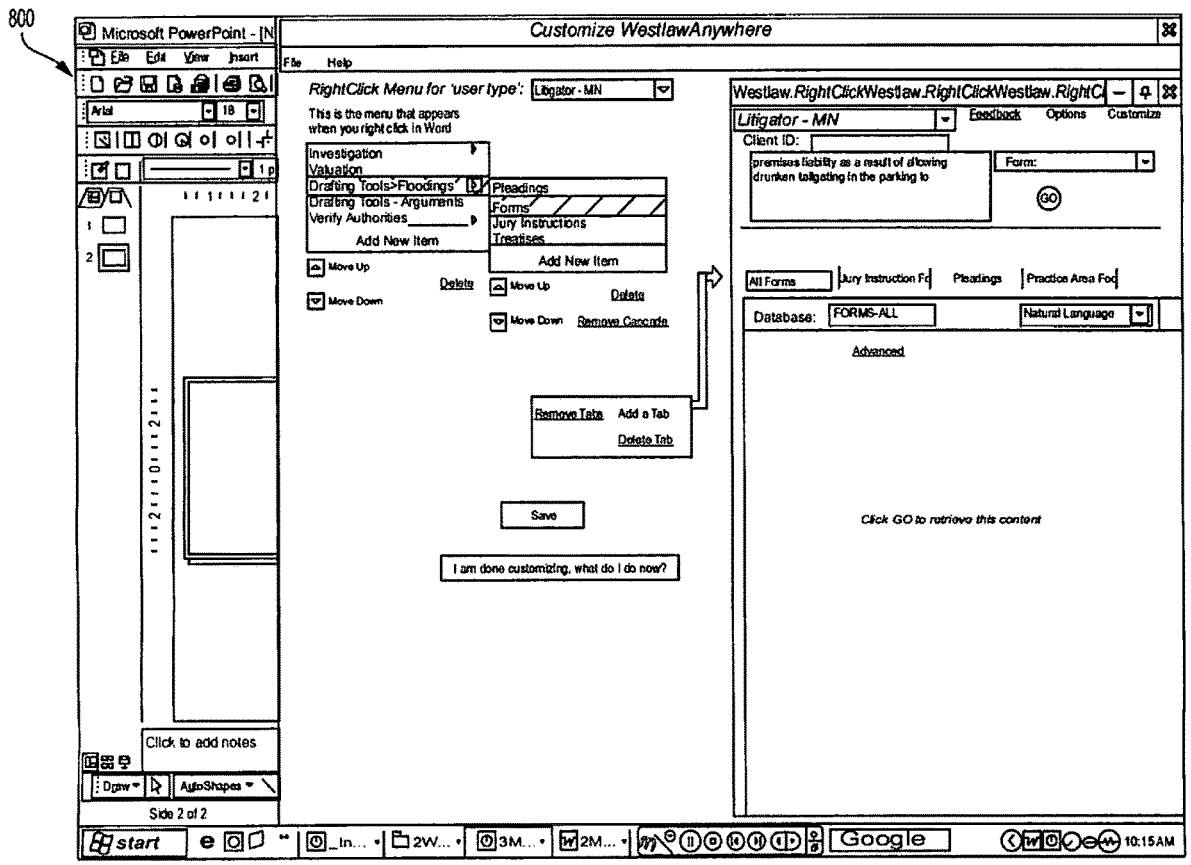
FIG. 8 is a facsimile of an exemplary user interface 800 corresponding to one or more embodiments of the invention.

FIG. 8 shows more generalized customization interface 800. For example, users can create their own items and customize down to the level of adding their own URL's and databases and menus. Thus, some embodiments include menu items that allow users to integrate with integrate to their firm portals or other Westlaw databases. Some embodiments may even allow users to add URLs to other password-protected commercial or non-commercial databases. Customization is done through a web service of the online research system, such as the Westlaw research system, where each user has an "account" that stores their various customized menus and allows them to create a new menu. At the end, the config menu is downloaded to the PC and self installed into research software and the plug-ins for the third-party applications.

Some embodiments provide pre-configured workflows and corresponding database choices. Market segments/editors can use the customization interface to create and publish new menus within days. Product ships with available pre-configured menus, and new menus periodically available over the web. Librarian at a firm can set up menus specific to that firm and to the appropriate people in the firm for one-click install. These menus can be firm specific such that a user at a firm will get the menu(s) designated by his/her librarian. Firms using the "network push" install can package custom menus for the designated users. User can choose their practice type and then jurisdiction to get a jurisdiction specific menu. On the fly, user can one-click switch the jurisdiction and practice type to fit into their current task. In one embodiment, the install process entails presenting the user will see a pick list of practice areas that are appropriate for that user (as designated by West based on the type of subscription, other information associated with the user account, such as individual or aggregate usage trends, and/or selections made a firm research software administrator. Other embodiments Allow users to select from panoply of preconfigured menus, to save multiple configurations with easy dropdown shifting and automatic update of $3^{rd}$ party apps. And still others allow users to "send" one or more portions of their customizations to other users.

Conclusion

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A system comprising:
a database of legal information; and
a legal-research tool included in a memory of at least one client access device, the at least one client access device having a processing unit operatively coupled to a display and the memory, the legal-research tool accessible in a context of a first independent application,
wherein the legal-research tool includes a uniform resource locator (URL) table with at least one URL entry specifying a URL for accessing a resource, in the database, associated with at least one legal workflow item, the URL including a first parameter field and a second parameter field distinct from the first parameter field, wherein the first parameter field is configured to hold a first value corresponding to an attribute of a user, wherein the second parameter field is configured to hold a second value distinct from the first value and corresponding to an attribute of the legal workflow item, wherein the attribute of the legal workflow item comprises at least one of a jurisdiction and a practice area within the database, and wherein the first value and the second value are configured to access the resource specified by the URL,
wherein the legal-research tool is configured to:
detect a selection of text and a selection of the at least one legal workflow item, by a user, from within the first independent application;
obtain the URL for accessing the resource associated with the selected at least one legal workflow item specified in the corresponding URL entry;
obtain the first value and the second value configured to access the resource specified by the URL, wherein the first value and the second value are extracted from a parameter file, and wherein the parameter file is configured to store the first value and the second value;
append the first value and the second value to the URL using the parameter file;
append at least a portion of the selected text to the URL;
couple the client access device to the database to access the resource specified by the URL based on the obtained value;
obtain data associated with the selected text from the resource specified by the URL, wherein the data associated with the selected text includes:
a portion of information associated with the selected text; and
a citation associated with the information, the citation having a format based on at least one of: the resource specified by the URL and a predefined format; and
cause, in response to the user invoking an interactive command from within a second independent application, insertion, from the resource, of both the portion of information associated with the selected text and the formatted citation associated with the information into the first independent application at a position within the first independent application denoted by an indicator of the first independent application.

2. The system of claim 1, wherein the first independent application is a word processing application, wherein the second independent application is a browsing application, wherein the attribute of the user corresponds to a password associated with the user, and wherein the attribute of the legal workflow item includes an identification number associated with a client.

3. The system of claim 1, wherein in the legal-research tool includes a graphical indicator to indicate via its display that the legal-research tool is available via right clicking, and wherein the system further comprises an application program interface (API) configured to facilitate the insertion of the portion of information associated with the selected text and the formatted citation associated with the information into the first independent application at the position within the first independent application denoted by the indicator of the first independent application.

4. The system of claim 3, wherein the graphical indicator is a vertical bar.

5. The system of claim 1, wherein the first independent application includes at least one menu and wherein the legal-research tool includes means for displaying the at least one legal workflow item as part of a set of legal workflow items within the at least one menu.

6. The system of claim 1, further including:
a memory storing configuration data for the legal-research tool, with the configuration data identifying the at least one of the practice area and the jurisdiction.

7. A method of accessing a database of legal information, including case law documents, law review articles, and statutes, using a legal-research tool, the method comprising:
selecting text within a window of a client access device;
displaying, on a display, at least one legal workflow item corresponding to at least one uniform resource locator (URL) entry in a URL table, the at least one URL entry specifying a URL for accessing a resource, in the database, associated with the corresponding at least one legal workflow item, the URL including a first parameter field and a second parameter field distinct from the first parameter field, wherein the first parameter field is configured to hold a first value corresponding to an attribute of a user, wherein the second parameter field is configured to hold a second value distinct from the first value and corresponding to an attribute of the legal workflow item, and wherein the first value and the second value are configured to access the resource specified by the URL; and
in response to a user right-clicking within the window after selection of the text and in response to selection of the at least one legal workflow item by the user:
obtaining the URL for accessing the resource associated with the selected at least one legal workflow item specified in the corresponding URL entry;
obtaining the first value and the second value configured to access the resource specified by the URL, wherein the first value and the second value are extracted from a parameter file, and wherein the parameter file is configured to store the first value and the second value;
appending the first value and the second value to the URL using the parameter file, wherein the first value corresponds to a user password, and wherein the second value corresponds to at least one of a client identifier, a jurisdiction within the database, and a practice area within the database;
appending at least a portion of the selected text to the URL;
accessing the resource based on the obtained value to obtain data corresponding to the URL;
obtaining data associated with the selected text from the resource specified by the URL, wherein the data associated with the selected text includes:
a portion of information associated with the selected text; and
a citation associated with the information, the citation having a format based on at least one of: the resource specified by the URL and a predefined format; and
inserting both the portion of information associated with the selected text and the formatted citation associated with the information, from the resource, into text within the window of the client access device at a position within the window denoted by an indicator of the window.

8. The method of claim 7, further comprising:
displaying a graphical indicator to indicate via its display that the legal-research tool for the database is available via right-clicking.

9. The method of claim 8, wherein the graphical indicator is a vertical sidebar.

10. The method of claim 7, wherein the window is displayed on the client device as part of a document processing application having at least one menu and wherein displaying the at least one legal workflow item further comprises displaying the at least one legal workflow item within the at least one menu.

11. The method of claim 7, further comprising:
storing configuration data that identifies the at least one of the practice area and the jurisdiction.

12. A system comprising:
a database of legal information, including case law documents, law review articles, and statutes;
a legal-research tool for accessing the database from a client access device, the legal-research tool including a set of legal workflow items, and a uniform resource locator (URL) table with at least one URL entry for each legal workflow item in the set of legal workflow items, the at least one URL entry specifying a URL for accessing a resource associated with the corresponding legal workflow item, and the URL including a first parameter field and a second parameter field distinct from the first parameter field, wherein the first parameter field is configured to hold a first value corresponding to an attribute of a user, wherein the second parameter field is configured to hold a second value distinct from the first value and corresponding to an attribute of the legal workflow item, wherein the attribute of the legal workflow item comprises at least one of a jurisdiction and a practice area within the database, and wherein the first value and the second value are configured to access the resource specified by the URL;
a document processing application of the client access device having at least one window and at least one right-click menu;
means, responsive to a user right-clicking within the window, for displaying the one right-click menu, wherein the menu includes the set of legal workflow items for the legal-research tool;
means, responsive to selection of one of the legal workflow items, for obtaining the URL for accessing the resource corresponding to the selected one of the legal workflow items in the URL table;
means for obtaining the first value and the second value configured to access the resource specified by the URL, wherein the first value and the second value are extracted from a parameter file, and wherein the parameter file is configured to store the first value and the second value;
means for appending the first value and the second value to the URL using the parameter file;
means for accessing the resource in the database, based, at least in part, on the obtained first value;
means for obtaining data associated with the selected text from the resource specified by the URL, wherein the data associated with the selected text includes:
a portion of information associated with the selected text; and
a citation associated with the information, the citation having a format based on at least one of: the resource specified by the URL and a predefined format; and
means, responsive to a command received through the legal-research tool, for inserting, from the resource, both the portion of information associated with the selected text and the formatted citation associated with the information into text displayed in the at least one window of the document processing application at a position within the at least one window denoted by an indicator of the at least one window.

13. The system of claim 12, wherein the legal-research tool includes a graphical indicator to indicate during operation of the document processing that the legal research tool for the database is available via right-clicking.

14. The system of claim 12, further comprising:
  means for storing configuration data that identifies the at least one of the practice area and the jurisdiction.

* * * * *

UNITED STATES PATENT AND TRADEMARK OFFICE
CERTIFICATE OF CORRECTION

PATENT NO. : 10,963,837 B2  
APPLICATION NO. : 15/244551  
DATED : March 30, 2021  
INVENTOR(S) : Trace Liggett Page 1 of 1

It is certified that error appears in the above-identified patent and that said Letters Patent is hereby corrected as shown below:

In the Claims

At Column 12, Claim number 12, Line number 55, delete "means for obtaining data associated with the selected text" and replace with --means for obtaining data associated with selected text--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*